(12) United States Patent
Sawada et al.

(10) Patent No.: US 8,187,094 B2
(45) Date of Patent: May 29, 2012

(54) GAME PROGRAM

(75) Inventors: Tsuyoshi Sawada, Tokyo (JP); Yasunori Gotoh, Tokyo (JP)

(73) Assignee: Sega Corporation, Tokyo (JP)

( * ) Notice: Subject to any disclaimer, the term of this patent is extended or adjusted under 35 U.S.C. 154(b) by 1521 days.

(21) Appl. No.: 11/231,776

(22) Filed: Sep. 22, 2005

(65) Prior Publication Data

US 2006/0116186 A1    Jun. 1, 2006

(30) Foreign Application Priority Data

Sep. 22, 2004    (JP) ................................. 2004-275866

(51) Int. Cl.
*A63F 9/24* (2006.01)
*A63F 13/00* (2006.01)

(52) U.S. Cl. ............................... 463/36; 463/37; 463/43

(58) Field of Classification Search .................. 463/8, 4, 463/36, 37

See application file for complete search history.

(56) References Cited

U.S. PATENT DOCUMENTS

| | | | | |
|---|---|---|---|---|
| 3,874,669 A | * | 4/1975 | Ariano et al. | 463/4 |
| 4,093,221 A | * | 6/1978 | Dash | 463/3 |
| 4,148,485 A | * | 4/1979 | Rains | 463/6 |
| 4,162,792 A | * | 7/1979 | Chang et al. | 463/4 |
| 4,386,776 A | * | 6/1983 | Bromley | 463/4 |
| 4,738,451 A | * | 4/1988 | Logg | 463/2 |
| 4,905,168 A | * | 2/1990 | McCarthy et al. | 345/474 |
| 5,287,446 A | * | 2/1994 | Williams et al. | 345/474 |
| 5,292,254 A | * | 3/1994 | Miller et al. | 434/11 |
| 5,390,937 A | * | 2/1995 | Sakaguchi et al. | 463/7 |
| 5,393,071 A | * | 2/1995 | Best | 463/35 |
| RE35,314 E | * | 8/1996 | Logg | 463/2 |
| 5,649,862 A | * | 7/1997 | Sakaguchi et al. | 463/44 |
| 5,941,708 A | * | 8/1999 | FitzGerald | 434/16 |
| 6,102,801 A | * | 8/2000 | Sugawara | 463/31 |
| 6,123,619 A | * | 9/2000 | Tokita et al. | 463/43 |
| 6,149,520 A | * | 11/2000 | Takatsuka | 463/4 |

(Continued)

FOREIGN PATENT DOCUMENTS

JP    2002166045 A  *  6/2002

OTHER PUBLICATIONS

"A Boy and His Blob" instruction manual for the NES, sourced from www.replacementdocs.com, released Jun. 1, 1989.*

(Continued)

*Primary Examiner* — Steven J Hylinski
(74) *Attorney, Agent, or Firm* — Dickstein Shapiro LLP

(57) ABSTRACT

In the game program, a computer 100 is operated as means for moving a game character in a game field, based on an input signal inputted from an operation unit 114 and outputting the motions to display means 110. The game program comprises the processing of setting a player character PC which moves, based on an operation signal inputted from an operation unit 114 by a game player and a partner character PT which moves, based on a prescribed movement algorithm, and judging whether or not a first input signal has been inputted from the operation unit, and the processing of restricting a range where the player character PC is movable to a prescribed range with a present position of the partner character PT in the gate field as a reference when it is judged that the first input signal has been inputted. The game program permits a player character a player operates and a partner character which supports the player character to make various cooperative motions.

7 Claims, 21 Drawing Sheets

U.S. PATENT DOCUMENTS

| | | | |
|---|---|---|---|
| 6,196,917 B1* | 3/2001 | Mathias et al. | 463/2 |
| 6,210,273 B1* | 4/2001 | Matsuno | 463/8 |
| 6,254,394 B1* | 7/2001 | Draper et al. | 434/11 |
| 6,287,196 B1* | 9/2001 | Kawano | 463/23 |
| 6,340,332 B1* | 1/2002 | Rimoto et al. | 463/31 |
| 6,409,604 B1* | 6/2002 | Matsuno | 463/43 |
| 6,424,353 B2* | 7/2002 | Yamamoto et al. | 345/619 |
| 6,426,752 B1* | 7/2002 | Goden | 345/473 |
| 6,461,237 B1* | 10/2002 | Yoshinobu et al. | 463/3 |
| 6,471,585 B1* | 10/2002 | Rimoto et al. | 463/4 |
| 6,514,142 B1* | 2/2003 | Hattori et al. | 463/31 |
| 6,533,663 B1* | 3/2003 | Iwao et al. | 463/32 |
| 6,558,258 B1* | 5/2003 | Rupert et al. | 463/33 |
| 6,595,850 B2* | 7/2003 | Yamaki | 463/1 |
| 6,666,769 B2* | 12/2003 | Stronach | 463/40 |
| 6,729,954 B2* | 5/2004 | Atsumi et al. | 463/7 |
| 6,935,955 B1* | 8/2005 | Kaminkow et al. | 463/35 |
| 6,938,898 B2* | 9/2005 | Merritt, III | 273/236 |
| 7,004,838 B2* | 2/2006 | Hayashida et al. | 463/31 |
| 7,126,607 B2* | 10/2006 | Emerson | 345/474 |
| 7,300,345 B2* | 11/2007 | Mifune et al. | 463/4 |
| 7,390,254 B2* | 6/2008 | Hirai | 463/4 |
| 7,399,224 B2* | 7/2008 | Hirai | 463/4 |
| 7,402,106 B2* | 7/2008 | Weisel et al. | 463/63 |
| 7,452,279 B2* | 11/2008 | Yamashita | 463/43 |
| 7,594,847 B1* | 9/2009 | York et al. | 463/5 |
| 2003/0109305 A1* | 6/2003 | Gavin et al. | 463/31 |
| 2004/0046800 A1* | 3/2004 | Emerson | 345/810 |

OTHER PUBLICATIONS

"GameFAQS: Suikoden II FaQ/Walkthrough by Sir Aronar", sourced from www.gamefaqs.com/console/psx/file/198844/4776, last updated Feb. 29, 2000.*

"Donkey Kong Country Walkthrough—IGN FAQS", sourced from http://faqs.ign.com/articles/644/644519p1.html, copyright 2001.*

"Donkey Kong Country 2: Diddy Kong's Quest" instruction manual, copyright 1995 Nintendo.*

"Donkey Kong Country 3: Dixie Kong's Double Trouble" instruction manual, copyright 1996 Nintendo.*

"Donkey Kong County" instruction manual, sourced from www.replacementdocs.com, released Nov. 24, 2004.*

"Unite Attacks—Suikoden Wika", sourced from http://suikoden.wikia.com/wiki/Unite_Attacks.*

"GameFAQs: Suikoden II (PS) Unite Attacks Guide by Jerome", sourced from http://www.gamefaqs.com/console/psx/file/198844/20394, last updated Nov. 28, 2002.*

"GameFAQs: Suikoden II (PS) FAQ/Walkthrough by JL Lee", sourced from http://www.gamefaqs.com/console/psx/file/198844/4778, last updated Jan. 16, 2000.*

"GameFAQs: Suikoden III (PS2) Combo FAQ by DFuzed", sourced from http://www.gamefaqs.com/console/ps2/file/536777/20089, last updated Dec. 12, 2002.*

"Suikoden: Unite Attacks—IcyBrian.com", sourced from www.icybrian.com/games/suikoden/unites.php, copyright 1997.*

"Suikoden" instruction manual, sourced from www.replacementdocs.com, copyright 1996 Konami.*

"Suikoden II" instruction manual, sourced from www.replacementdocs.com, release date Sep. 25, 1999.*

"Suikoden III" instruction manual, sourced from www.replacementdocs.com, copyright 2002 Konami.*

"Suikosource: Weblog: Suikoden IV Update #2", sourced from http://www.suikosource.com/weblog/2004/04/10/suikoden_iv_update_2.php, published Apr. 10, 2004.*

"Suikoden Tactics" instruction manual, copyright 2005 Konami.*

"Suikoden V" instruction manual, copyright 2006 Konami.*

"With giant swings, your comrade gets thrown" in-game screen shot from Suikoden IV to illustrate a combo attack. Sourced from http://www.suikosource.com/images/games/gs4/preview/040904/Combat3.jpg. Published Apr. 9, 2004.*

"GameFAQs: Super Mario Bros. 2 (NES) FAQ/Walkthrough by Snow Dragon", sourced from http://www.gamefaqs.com/console/nes/file/525244/12524, last updated Aug. 26, 2002.*

"Super Mario 64" instruction manual, copyright 1996 Nintendo.*

"Super Mario Bros. 2" instruction manual, sourced from www.replacementdocs.com, release date Oct. 1988.*

"Super Mario Bros." instruction manual, copyright 1985 Nintendo.*

"Super Mario RPG" instruction manual, copyright 1996 Nintendo/Square.*

"Super Mario World 2 Yoshi's Island" instruction manual, Copyright 1995 Nintendo.*

"Super Mario World" instruction manual, Copyright 1991 Nintendo.*

"Final Fantasy Crystal Chronicles, Official Guide Book, Complete Edition," Square Enix Co., Ltd., Oct. 10, 2003, First Edition, pp. 37 and 50.

"Sakura Wars 2, -Don' you Dare Lay Down Your Life. -,Strategy Guide Book, Volume of Earth, for Professional," Ascii Inc., Jul. 4, 1998, First Edition, p. 30.

* cited by examiner

GAME PROGRAM

BACKGROUND OF THE INVENTION

The present invention relates to a game program used in a game device and a game control method, more specifically a game program for operating a computer as means for operating a plurality of characters in a game field and outputting the motions of the characters to display means.

In some conventional video games, one game player operates operating means to move the player character in a game field, and the so-called partner character moves, following the player character in the game field to make motions to assist motions of the player character.

In some cases, the partner character is caused to imitate the motions of the player character, e.g., by giving prescribed time lags to operation inputs for the player character to thereby use the operation inputs for controlling the motion of the option character.

Patent Reference 1 is Specification of Japanese Patent Application Unexamined Publication No. 2002-355440.

However, such partner character merely traces motions of the player character and lacks strategies which are cooperative with the player character to thereby progress the game advantageously to the game player.

SUMMARY OF THE INVENTION

An object of the present invention is to provide a game program which permits the player character operated by a game player, and a partner character supporting the player character to make various cooperative movements.

Another object of the present invention is to provide a game program which permits a first player character which is operated by a first game player, and a second player character which is operated by a second game player to make various cooperative movements.

The game program according to one aspect of the present invention is characterized in the game program for operating a computer as means for moving game characters in a game field, based on input signals inputted from an operation unit and outputting the motions to display means, a player character which moves based on input signals a game player inputs from the operation unit, and a partner character which moves based on a prescribed motion algorithm contained in the game program being set, the game program comprising: the processing of judging whether or not a first input signal has been inputted from the operational unit; and the processing of restricting a range where the player character is movable to a prescribed range set with the present position of the partner character in the game field as a reference when it is judged that the first input signal has been inputted.

The game program according to one aspect of the present invention is characterized in the game program for operating a computer as means for moving game characters in a game field, based on input signals inputted from a first operation unit and a second operation unit and outputting the motions to display means, a first player character which moves based on operation signals a first game player inputs from the first operation unit, and a second player character which moves based on operation signals a second game player inputs from the second operation unit being set, the game program comprising: the processing of judging whether or not a first input signal has been inputted from the first operation unit; the processing of judging whether or not a second input signal has been inputted from the second operation unit; the processing of, when it is judged that the second input signal has been inputted from the second operation unit and that the first input signal has been imputted from the first operation unit, based on a positional relationship between the first player character and the second player character and a kind of a prescribed cooperative motion set corresponding to the input signal inputted from the second operation unit, determining an effective range of the cooperative motion; and the processing of executing the cooperative motion in the determined effective range.

According to the present invention, based on a positional relationship between a player character which is operated by a game player and a partner character which makes motions based on a prescribed algorithm, an effective range or a generation point of a cooperative movement set corresponding to the player character or the partner character, or a combination of them, the cooperative movement of the characters is controlled, based on the setting, and parameters for motions of an enemy character are varied by the cooperative movement, whereby the game can be more amusing than the game advance singly by the player character.

According to the present invention, based on a positional relationship between a first player character which is operated by a first game player and a second player character which is operated by a second game player, an effective range and a generation point of a cooperative movement set corresponding to the first player character or the second player character or a combination of them are set, and the cooperative movement of the characters is controlled based on the setting, and parameters of motions of an enemy character are varied by the cooperative movement, whereby the game can be more amusing than the game advanced singly by one of the player characters.

DETAILED DESCRIPTION OF THE INVENTION

A First Embodiment

The game program according to one embodiment of the present invention will be explained with reference to the drawings.

In the present embodiment, a game device having the data processing function (computer function) executes the game application program according to the present embodiment so that a game player can operate an electronic game.

The story of the game application program according to the present embodiment is that in the one-player game, a player character which is operated by one game player, and a partner character controlled by the computer cooperate in going on defeating enemies.

In the two-player game, a player character which is operated by a first game player, and a player character which is operated by a second game player cooperate in go on defeating enemies.

(Summary of the Game System)

Figure 1:
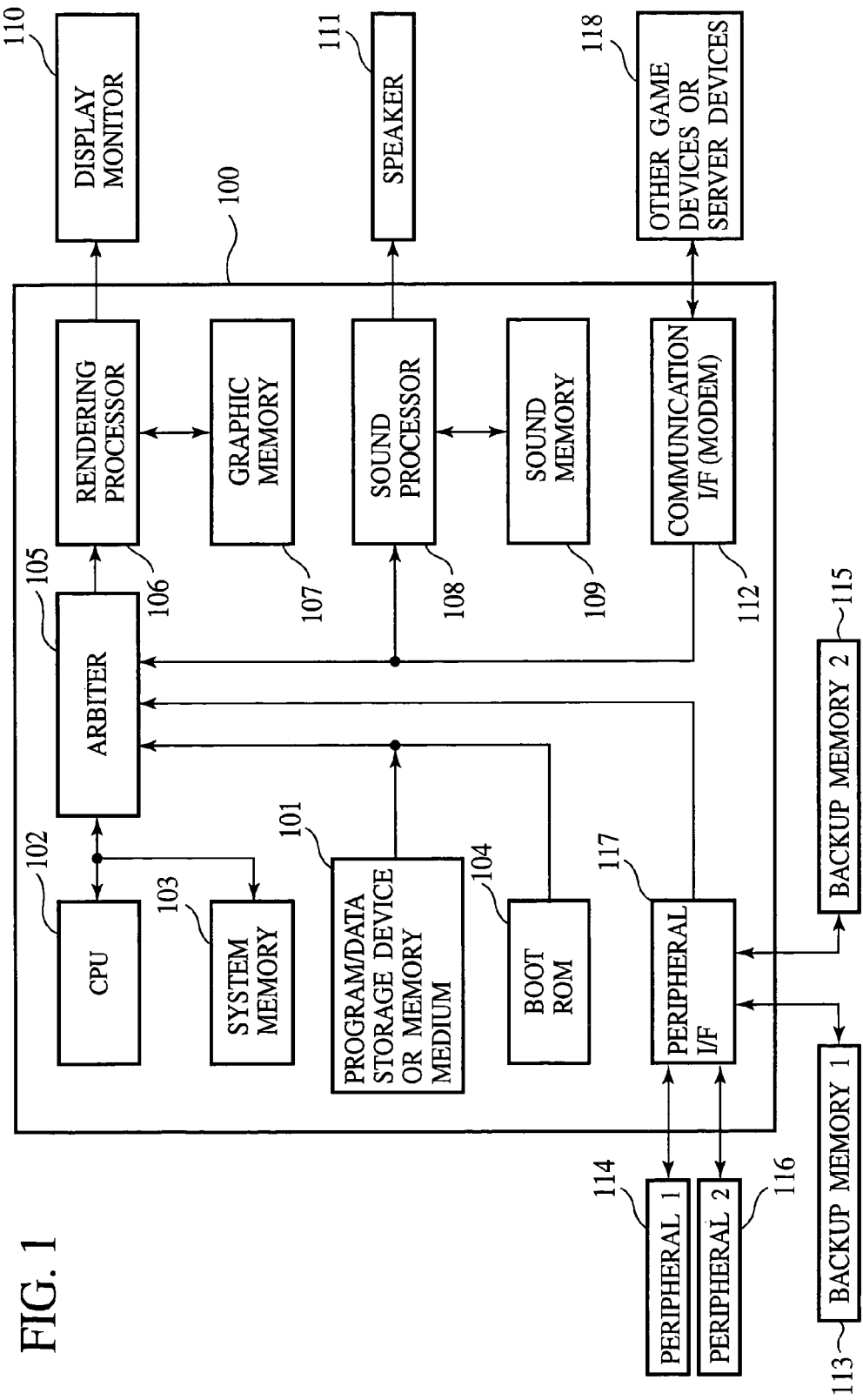
FIG. 1 is a block diagram of the game device according to one embodiment of the present invention.

First, the constitution of the game device will be explained. FIG. 1 is a block diagram of the electronic game device involved in the present invention. The game device 100 comprises a program data memory or a memory medium (including optical discs and optical disc drives, etc.) storing the game program data (including image and music data) 101, a CPU 102 which executes the game program, generally controls the system, computes coordinates for image displays, etc., a system memory 103 storing programs and data which are necessary for the CPU 102 to make the processing, a BOOTROM 104 storing programs and data which are necessary to actuate the game device 100, and a bus arbiter 105 which controls the flows of the programs and data between the respective blocks of the game device 100 and between the respective blocks and the outside apparatuses connected to the respective blocks, which are interconnected to each other by a bus.

A rendering processor 106 is connected to the bus. The rendering processor 106 displays image (movie) data read from the program data memory or a memory medium 101 and images to be produced corresponding to an operation by a game player and game progress on a display monitor 110. Graphic data, etc. necessary for the rendering processor 106 to produce images are stored in a graphic memory (frame buffer) 107. The CPU 102 and the rendering processor 106 constitute an image computation processing unit.

A sound processor 108 is connected to the bus. The sound processor 108 outputs from a speaker 111 music data read from the program data memory or a storage medium 102 and effective sounds, and sounds and voices to be produced corresponding to an operation by the game player and a game progress. A sound processor 108 stores sound data, etc. which are necessary for the sound processor 108 to produce effective sounds, and sounds voices.

The game device 100 has a communication I/F 112 which is typically a modem or others and can communicate with other game devices or network severs 118 through communication networks, such as telephone circuits or others. Furthermore, to the game device 100 there are connected backup memories 113, 115 (including disc memory mediums and storage devices), 2 peripherals 114, 116 which are controllers for inputting information for controlling the game device 100 and the apparatuses connected outside to the game device 100. A first game player operates the peripheral 114, and a second game player operates the peripheral 116.

The units of the game device, which have been described above as the constituent parts of the game device, may be divided in other game devices and servers. The game device terminal on the side of a game player, and a server may realize the electronic game device, i.e., the electronic game device involved in the present invention.

(One-Player Game)

Figure 2:
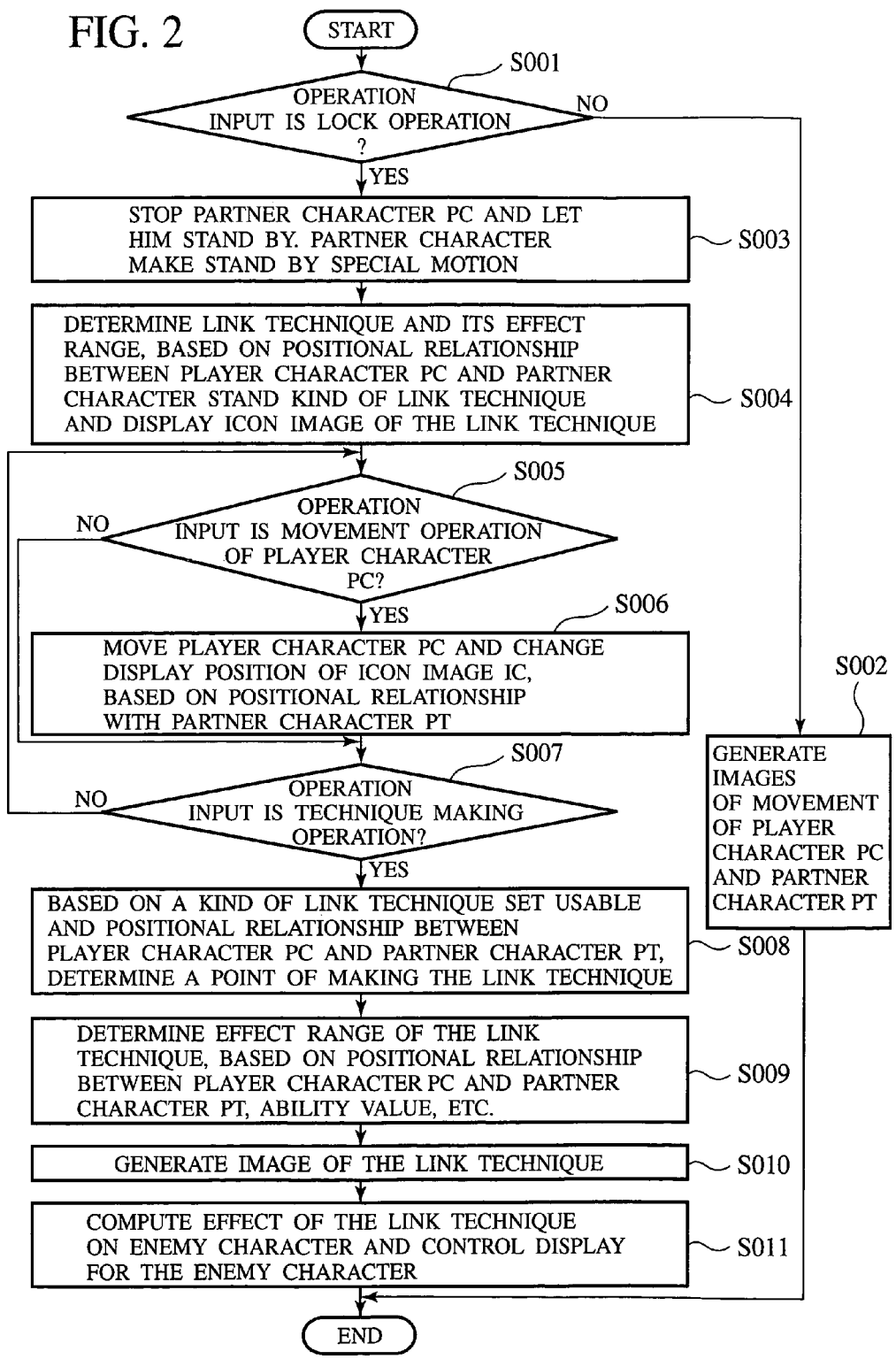
FIG. 2 is the flow chart of the processing of a LINK technique of a one-player game using the game program according to the embodiment of the present invention.

Next, characteristics of the one-player game using the game program according to the present embodiment will be detailed with reference to FIGS. 2 to 8. FIG. 2 is the flow chart of the processing of a link technique according to the game program. FIGS. 3 to 8 are examples of the game images displayed on the display monitor 110 in the processing of the link technique.

Figure 3:
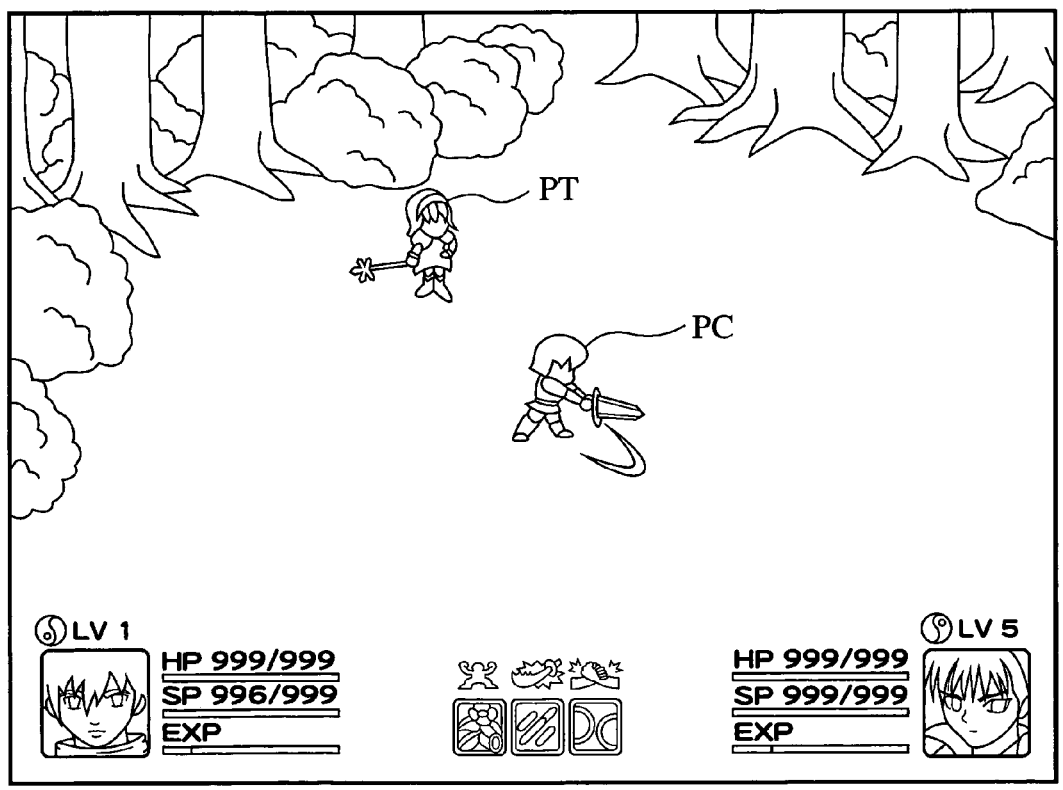
FIG. 3 is a scene of the game images of the one-player game.

In the one-player game, a player character operated by one game player, and a partner character controlled by the computer cooperate to defeat enemies. As illustrated in FIG. 3, the game is advanced by the player character PC operated by the game player, and the partner character PT controlled to follow the player character PC by the program.

The partner character PT normally moves in a field and makes fights, etc. with enemy characters autonomously other than by the operation of the game player, but the game player can command a prescribed movement to the partner character PT by making a prescribed operation input from the peripheral (controller) 114, which is the operational unit.

In the present embodiment, movements which can be commanded to the partner character PT are four kinds of movements, MOVE, RUSH, LOCK and LINK. The respective movements will be detailed.

The MOVE is the operation which moves the partner character PT, based on an operation signal inputted from the operation unit. The partner character PT normally moves autonomously based on his own algorithm, but this operation by the game player has the priority to the autonomous movement in moving the partner character PT. When the input of the operation signal is stopped, the partner character returns to the normal autonomous movement.

The RUSH is the operation which moves the partner character PT over a set distance in a prescribed direction faster than the normal movement. In addition to simply moving the partner character PT faster, effects of concurrently generating the attack judgment to given a prescribed damage to the physical power parameter of an enemy character located on a movement track or near the movement track may be added.

The LOCK is the operation which fixes the partner character PT at the present position, based on an operation signal input from the R1 button of the peripheral (controller) 114, which is the operation unit. This is a movement which is also the preparatory movement for a cooperative movement with the player character PC (hereinafter called "LINK") which will be described later.

The player character PC is set to be unable to be spaced from the partner character PT farther than a prescribed distance set corresponding to a kind of the LINK technique and ability parameters, etc. of respective characters until the LINK state is released by starting the LINK technique which will be described later, by not starting the LINK technique but making the cancel operation, or other means.

Figure 4:
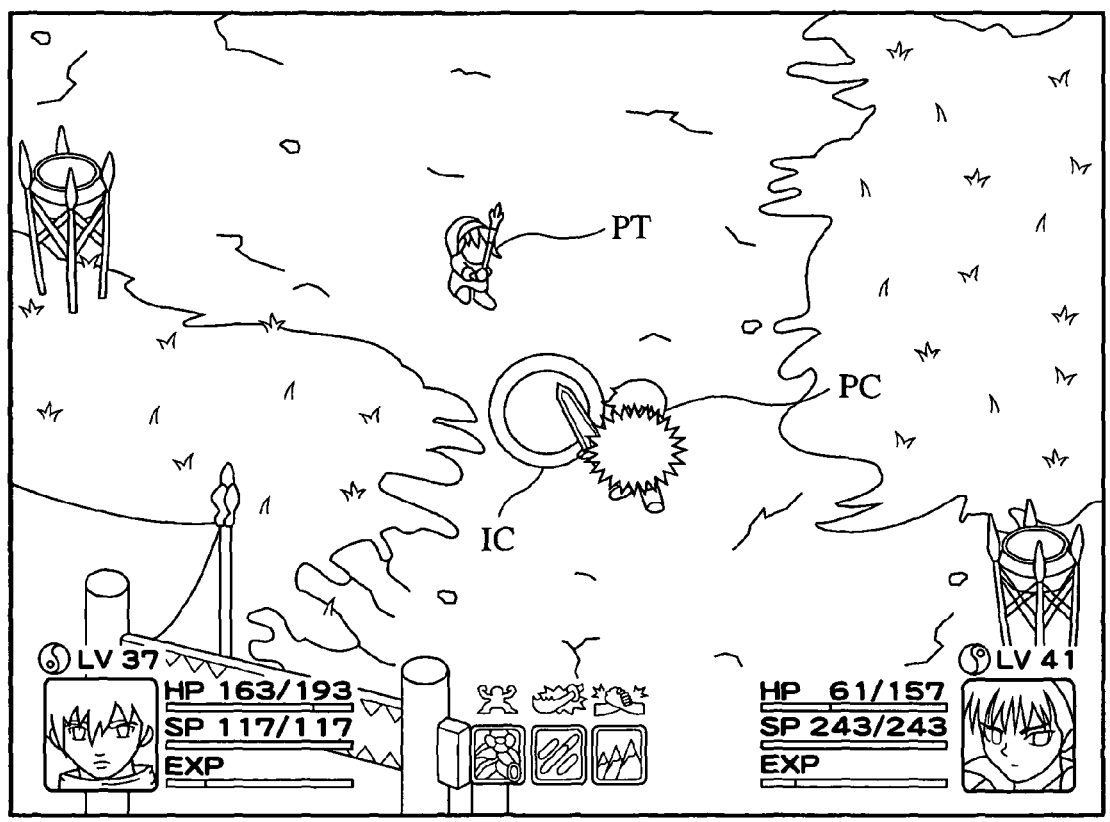
FIG. 4 is a game image illustrating the process of generating the LINK technique in the one-player game (Part 1).

In the present embodiment, the partner character PT is locked (LOCK), whereby as illustrated in FIG. 4, a LINK technique icon IC indicating a place and a direction where the LINK technique is started, a kind of the LINK technique, etc. is displayed substantially at the middle of a position of the player character PC and a position of the partner character PT.

At this time, the player character PC is displayed, rendered to brighten so as to indicate that the player character PC is locked (LOCK).

Figure 5:
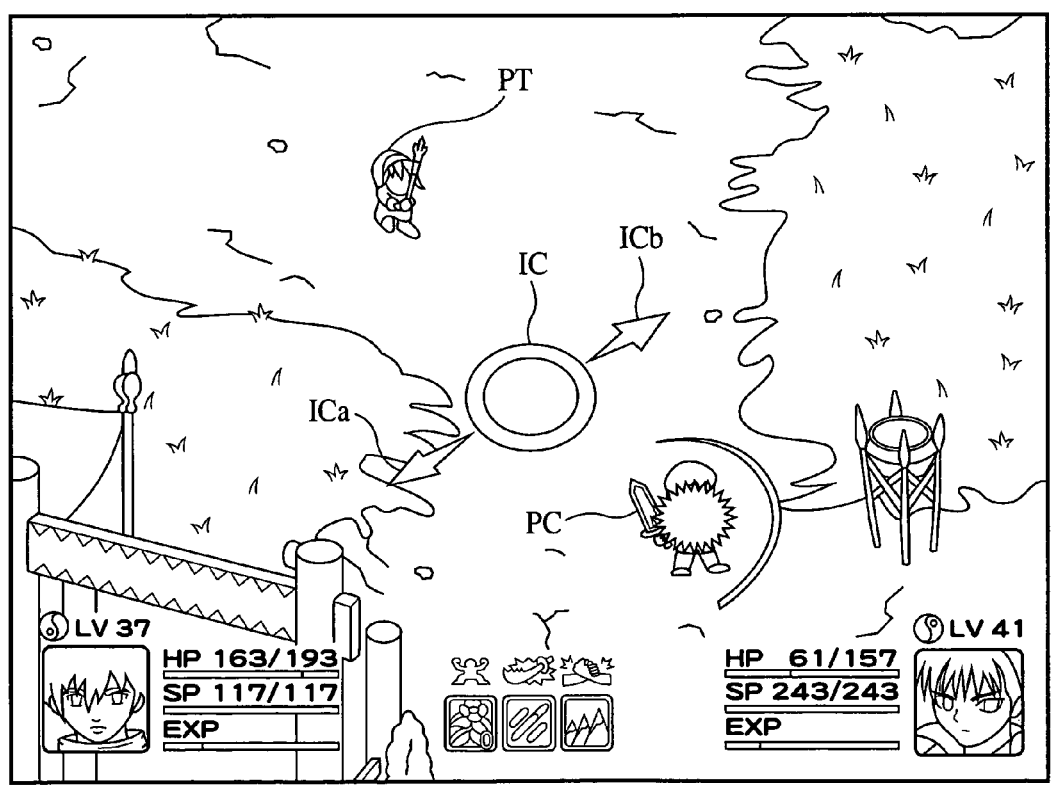
FIG. 5 is a game image illustrating the process of generating the LINK technique in the one-player game (Part 2).

In this LOCK state, the player character PC is moved, whereby, as illustrated in FIG. 5, a positional relationship between the player character PC and the partner character PT is changed, and interlocked therewith, a display position of the LINK technique icon IC is moved to be displayed substantially at the middle between a position of the player character PC and a position of the partner character PT.

In the present embodiment, in this LOCK state, the partner character PT is controlled to make a special motion-on-standby exclusively used in the LOCK. One to several kinds of the special motions-on-standby is set for each of a plurality of the partner characters. Whether or not the LINK technique is made, the partner character PT makes a special motion-on-standby at a place the game player likes, whereby the game can be made more strategic and more amusing to the game player.

Figure 8:
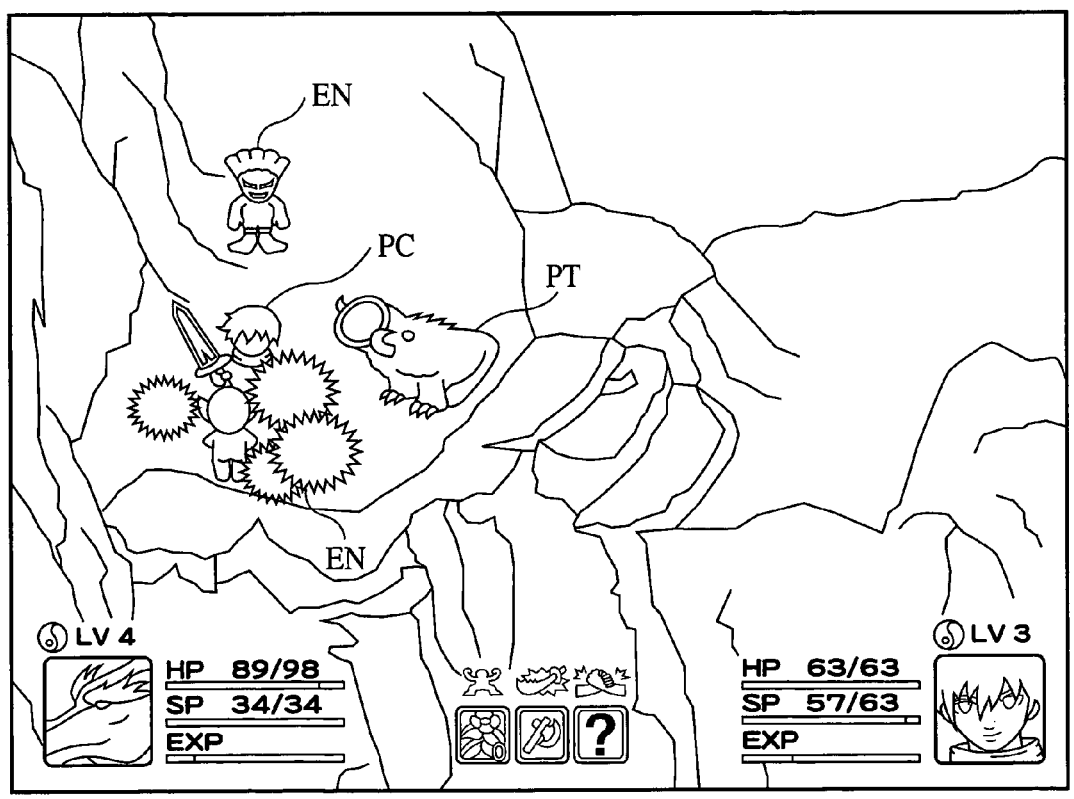
FIG. 8 is a game image illustrating the process of generating the LINK technique in the one-player game (Part 5).

For example, in the example illustrated in FIG. 8, for the partner character PT, a special motion-on-standby "the partner character PT stops at a position where the partner character PT is locked and emits flames forward" is set.

When the partner character PT is locked (LOCK), an image of the partner character PT emitting fire forward at the present position, and the physical power parameter of an enemy character EN which is judged to have contacted the fire is decreased by a prescribed quantity, whereby the game player can advantageously progress the game.

The extent and the quantity of the effect of the special motion-on-standby is determined based on a parameter of the ability of the partner character PT. The partner character PT is given items which are effective to change the experience value and the ability parameter acquired by defeating an enemy character EN, whereby the ability parameter is grown and changed to thereby widen the extent of the effect or increase the power.

The special motion-on-standby is set not only to influence all enemy characters, but also to influence the enemy characters differently, depending on kinds of the enemy characters or to influence none of the enemy characters.

In place of influencing the enemy characters, various parameters of the character in the LOCK may be changed. For example, the defense power parameter of the character in the LOCK may be increased by a prescribed value, or parameters of the physical power, etc. which vary, depending on game progresses may be restored by adding or subtracting a prescribed value corresponding to a duration of the LOCK.

The LINK is the operation which starts the LINK technique, based on an operation signal again inputted by the game player in the LOCK from the R1 button of the peripheral (controller) 114, which is the operation unit.

Figure 6:
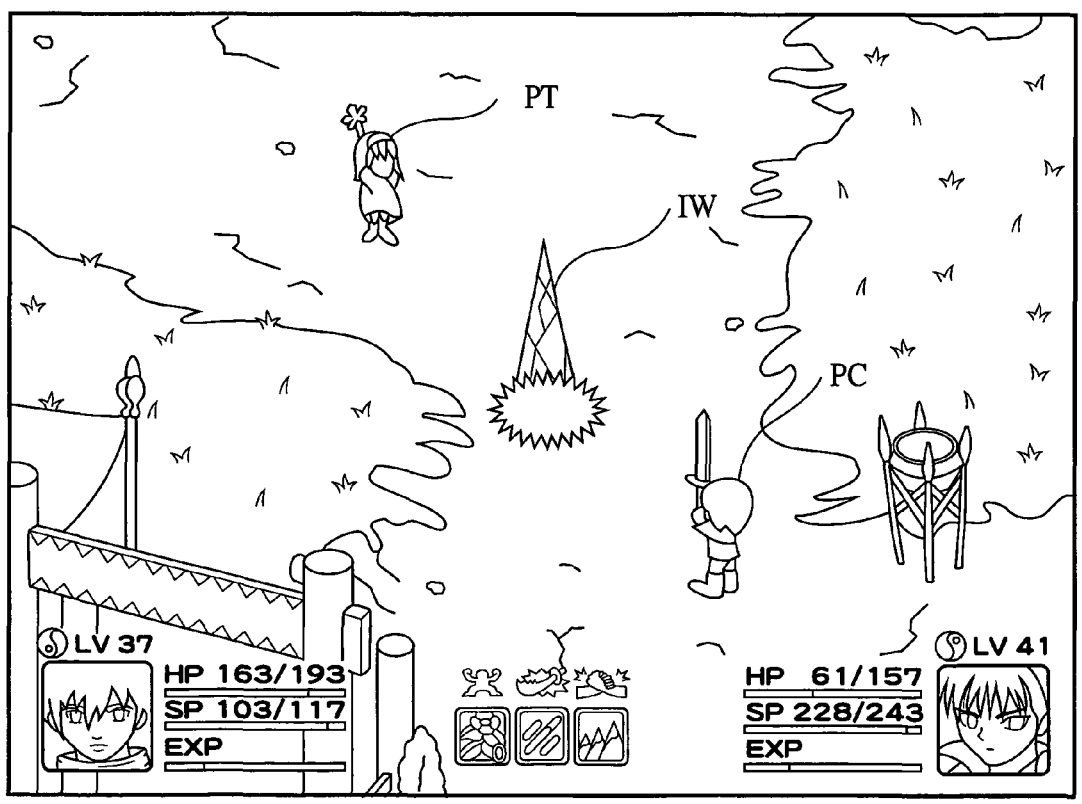
FIG. 6 is a game image illustrating the process of generating the LINK technique in the one-player game (Part 3).
Figure 7:
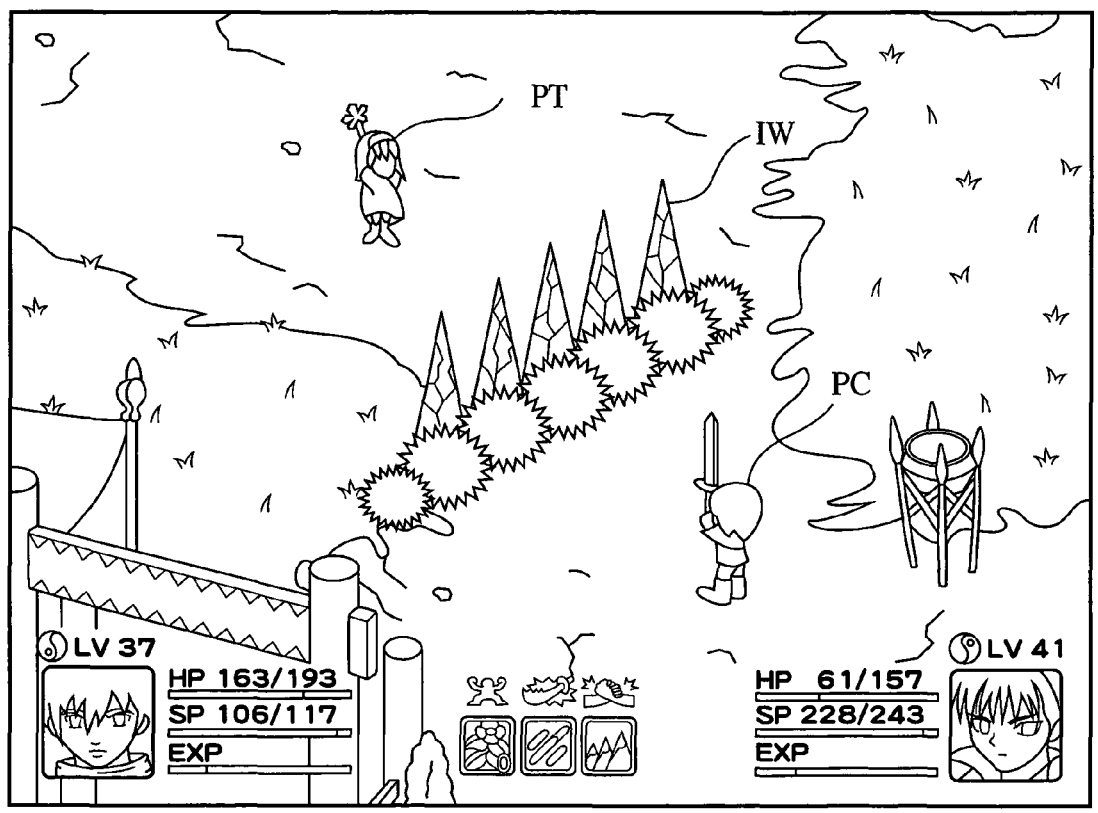
FIG. 7 is a game image illustrating the process of generating the LINK technique in the one-player game (Part 4).

In the present embodiment, first, as illustrated in FIG. 6, an ice pillar is displayed at the center of a position where a LINK technique icon is displayed, and then, as illustrated in FIG. 7, a prescribed number of ice pillars IW which are set based on effect levels, etc. of the LINK technique are displayed one after another, and an ice wall IW is displayed.

A hit of the ice pillars or the ice wall IW against an enemy character is judged, and when the hit is judged to have been made, the physical power parameter of the enemy character is subtracted.

To express the characteristic of the ice pillars and the ice wall, it is possible to make the processing that the enemy character is temporarily paused so that the enemy character cannot make other movements, etc.

The effect of the LINK technique may be varied, based on distances between a player character PC and the partner character PT.

For example, when two characters PC, and a partner character PT are near each other, the extent of the effect is decreased by, e.g., more subtracting the physical power property of the enemy character in place of decreasing the number of the ice pillars 1A, and when the two characters PC, and the partner character PT are remote from each other, the number of the ice pillars IW is increased to less subtract the physical power of the hit enemy character in place of increasing the extent of the effect by increasing the number of the ice pillars. IW. This allows a game player to control the extent of the effect and power of the LINK technique corresponding to the number and strength of the enemy characters.

In the present embodiment, a direction in which the LINK technique LINK is made is indicated by an arrow ICa and an arrow ICb the LINK technique IC has. This direction is set normal to the line interconnecting the player character PC and the partner character PT and is controlled to change corresponding to a positional relationship between the player character PC and the partner character PT.

This allows the game player to control a direction in which the LINK technique is made, e.g., the ice pillars IW are generated, by operating the player character PC to change a positional relationship with the partner character PT which has been locked (in the LOCK). This produces the effect of making the game amusing.

(Processing Flow of the One-Player Game)

The processing flow of the one-player game based on the game program according to the present embodiment will be explained.

First, when the game program is started, the CPU 102 judges whether or not a LOCK operation has been inputted by the peripheral (controller) 114 (Step S001).

When no LOCK operation input has been made, a player character PC and a partner character PT are moved, based on operation signals, a prescribed algorithm, etc., and the motions are generated in game images (Step S002).

When a LOCK operation input has been made, the partner character PT is stopped at a position of the partner character PT upon the input of the LOCK operation and stands by there (Step S003). At this time, the partner character PT in the LOCK has the defense power parameter increased by a prescribed quantity while being controlled to a special motion-on-standby set for the partner character PT.

Then, in this standby state, the player character PC and the partner character PT are related in the position with each other, based on a positional relationship between the player character PC and the partner character PT at this time and a kind of the LINK technique set usable at this time, and a form and a display position of an icon image indicating the kind of the LINK technique and the effect extent are determined, and the processing for displaying the icon image on the display monitor 110 is made (Step S004).

Then, the CPU 102 judges whether or not a movement operation signal for the player character PC has been inputted from the peripheral (controller) 114 (Step S005). A range in which the player character PC can move is controlled to be within a prescribed range set based on ability values of the player character PC and the partner character PT, the kind of the LINK technique set usable at this time, etc.

When the movement operation input for the player character PC has been made, the player character PC is moved in response to the operation input while the form and the display position of the icon image are changed based on a movement position of the player character PC and the standby position of the partner character PT (Step S006).

When no movement operation input for the player character PC is made, the above-described processing of Step S006 is skipped, and the next Step S007 follows.

Then, the CPU 102 judges whether or not an operation signal for making the LINK technique has been inputted from the peripheral (controller) 114 (Step S007).

When the operation signal input for making the LINK technique has been made, the CPU 102 determines a starting point of the LINK technique, based on a positional relationship and a distance between the player character PC and the partner character PT at this time (Step S008).

The processing of Step S008 may be made before the judgment of Step S007 is made. The identification of a kind of the LINK technique in Step S008 may be performed in any of Steps S001-S008. In this case, the icon of the LINK technique has an image which is not directly related with the kind of the LINK technique.

Then, the effective range of the effect of the LINK technique is determined based on the positional relationship between the player character PC and the partner character PT and ability values of them, parameters of the extent of the effect of the LINK technique, etc. (Step S009). The image of the LINK technique is generated (Step S010), and the effect of the LINK technique made to the enemy character positioned in a specific effective range is computed, and the display of the enemy character corresponding to the effect is controlled (Step S011). Thus, the processing for the LINK technique of the one-player game is completed.

As described above, according to the present embodiment, the 1-layer game has, for example, the following advantage for the game players in comparison with the conventional game. That is, a player character PC is moved from a position of a partner character PT as the reference to determine the effective range of the LINK technique and a starting point, whereby the game players can feel as if they were moving in closer cooperation with the partner character PT than in the game players operating to simply generate techniques owned by the partner character PT.

(Two-Player Game)

Figure 9:
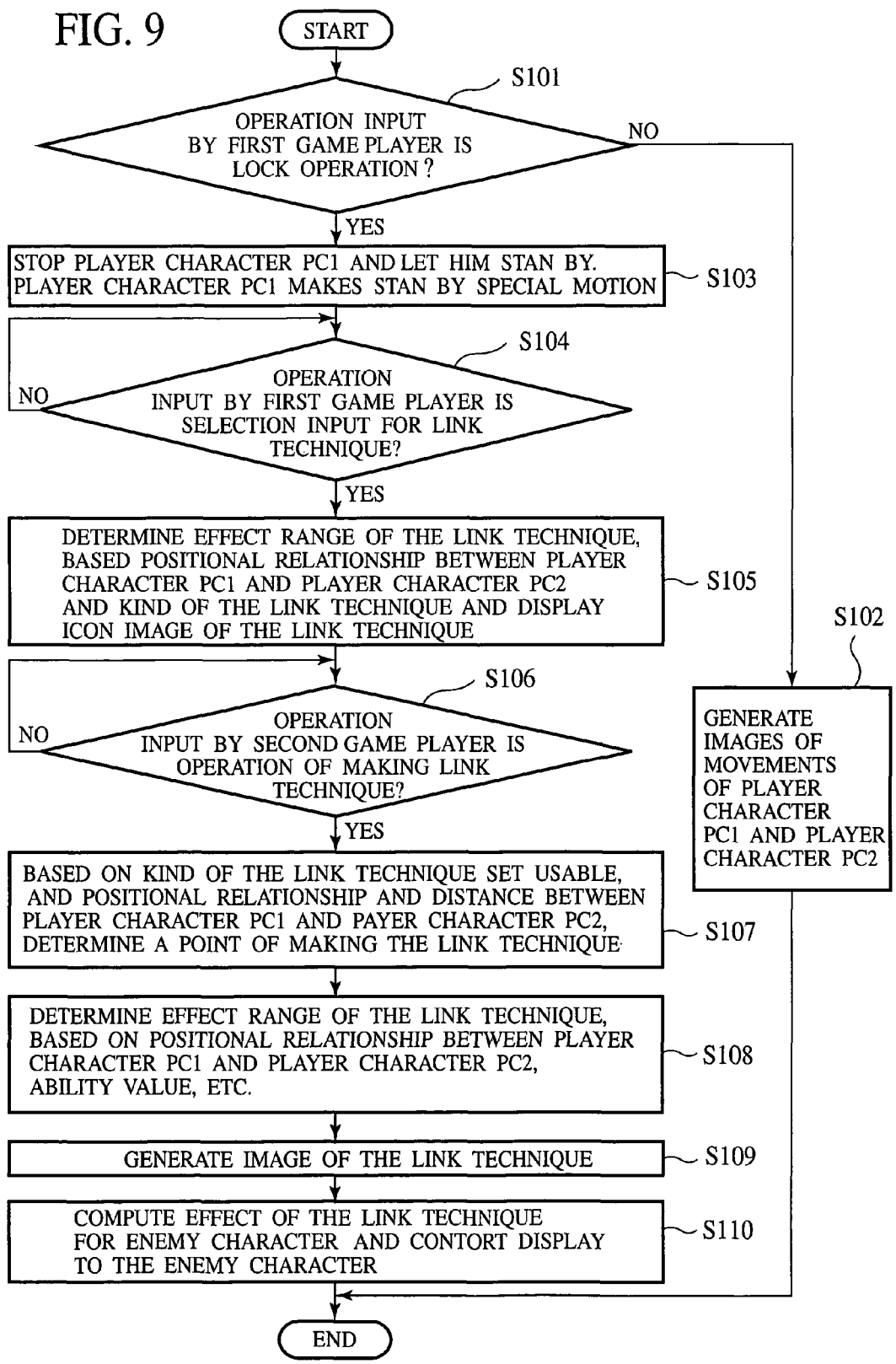
FIG. 9 is the flow chart of the processing of a LINK technique of a two-player game using the game program according to the embodiment of the present invention.

Next, characteristics of the two-player game using the game program according to the present embodiment will be detailed with reference to FIGS. 9 to 21. FIG. 9 is the flow chart of processing the LINK technique by the game program according to the present embodiment. FIGS. 10 to 21 are examples of the game images displayed on the display monitor 110 in the processing of a LINK technique.

Figure 10:
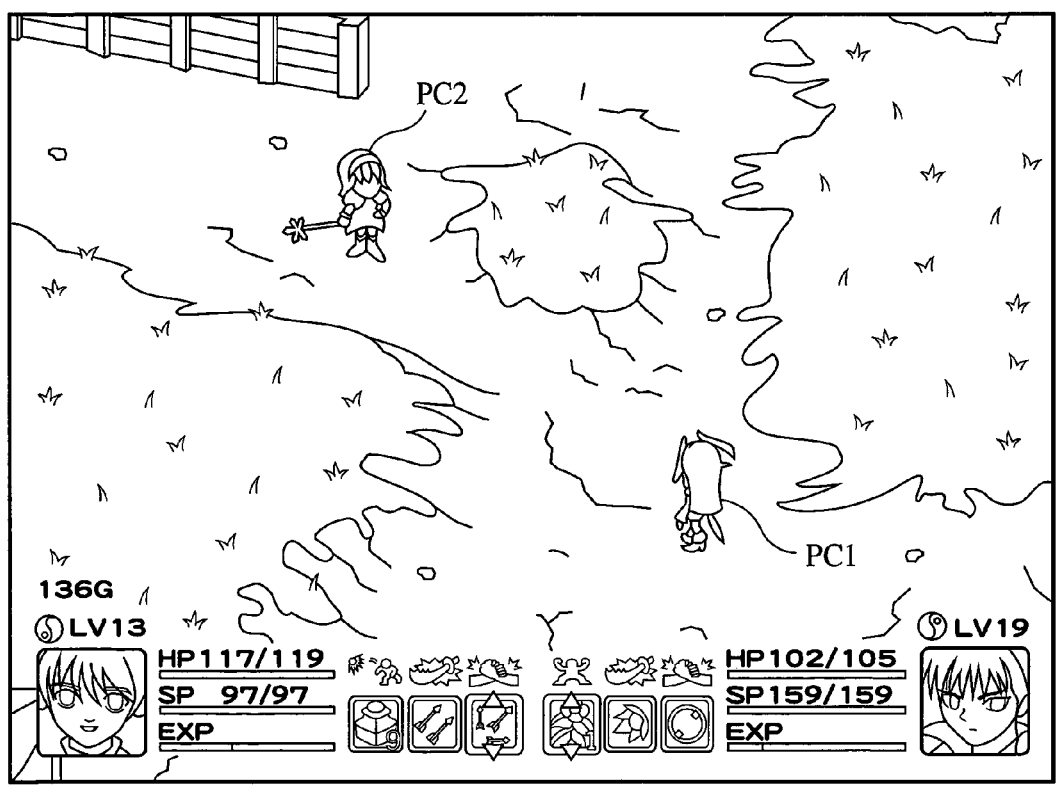
FIG. 10 is a scene of the game images of the two-player game.

In the two-player game, a player character operated by a first game player and a player character operated by a second game player cooperate with each other to defeat an enemy. As illustrated in FIG. 10, the game is advanced by a first player character PC1 operated by a first game player and a second player character PC 2 operated by a second game player.

Normally, the first game player operates one peripheral (controller) 114 to control the first player character PC1, and the second game player operates the other peripheral (controller) 116 to control the second player character PC2.

In the LINK technique which will be described later, the first game player operates to provide as the cooperator the first player character PC1, which is his, and the second game player operates to execute a cooperative movement by the second player character PC2, which is his, in cooperation with the first player character PC1 of the first game player.

It is possible that oppositely, the second game player operates to provide as the cooperator the second player character PC2, which is his, and the first game player operates to execute a cooperative movement by the first player character PC1, which is his, in cooperation with the second player character PC2 of the second game player.

It is also possible that both game players operate to provide the first player character PC1 and the second player character PC2 as the characters for a cooperative movement, and both game players operate to concurrently execute two cooperative movements by the first player character PC1 and the second player character PC2.

In the present embodiment, movements which are commanded to the player characters PC1, PC2 in connection with the LINK technique are LOCK and LINK.

The LOCK is the operation that a first game player fixes his player character PC1 at the present position by inputting an operation signal from the R1 button of the peripheral (controller) 114. The LOCK is also the preparatory motion for a cooperative movement (hereinafter called a LINK technique) with the other player character PC, which will be described later.

At this time, the player character PC2 may be set to be unable to be spaced from the player character PC1 further than a prescribed distance set corresponding to a kind of the LINK technique and the ability parameter, etc. of respective characters until the LINK state is released by making the LINK technique or by not making the LINK technique but making a cancel operation or by other means.

Figure 11:
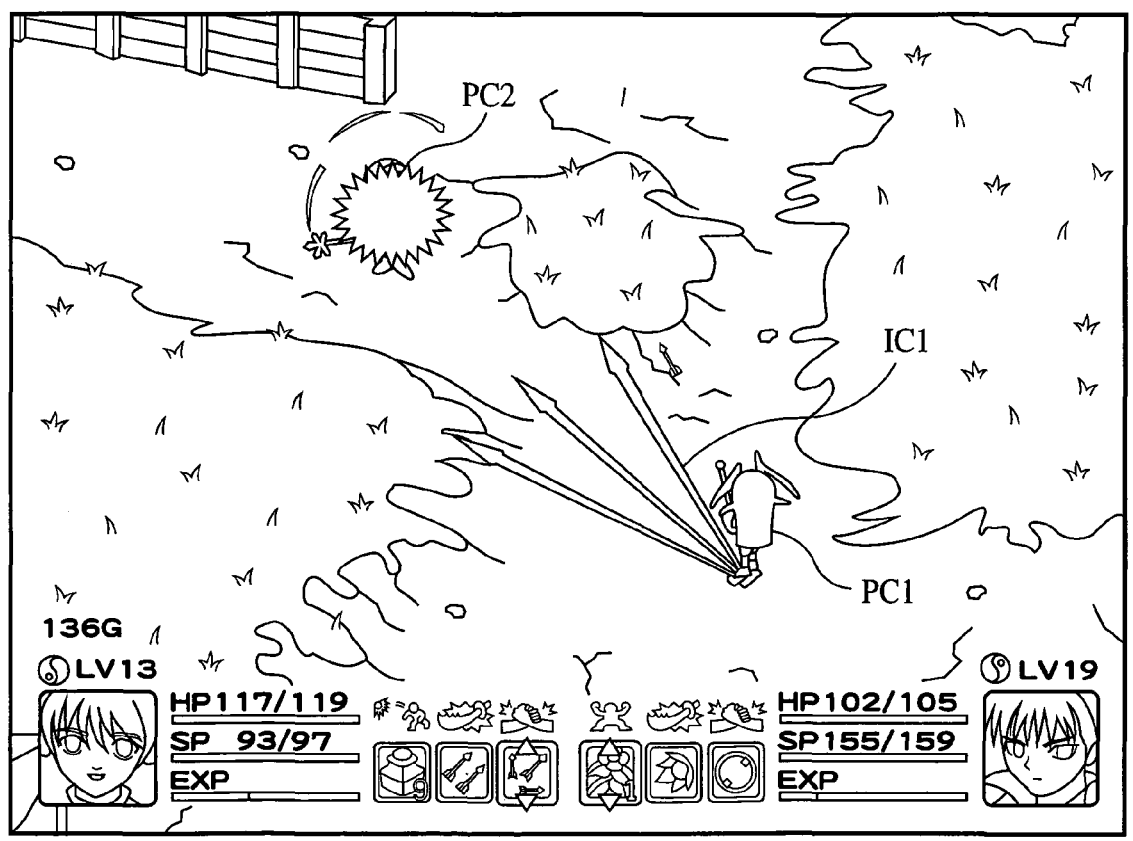
FIG. 11 is a game image illustrating the process of generating the LINK technique in the two-player game (Part 1).

The player character PC1 is locked (LOCK), whereby, as illustrated in FIG. 11, a LINK technique icon IC1 expressing a place, a direction, a form, etc. where the player character PC1 makes the LINK technique toward the player character PC2 is displayed.

At this time, the player character PC 2 is rendered to brighten so as to indicate that the player character PC1 is LOCKED and is able to make the LINK technique.

In the LOCK, the defense ability of the player character PC1 is controlled to be increased, and the player character PC1 is controlled to make a special motion-on-standby which is exclusive for the LOCK.

Plural kinds of the special motions-on-standby are set in advance for the player character PC1, and the player character PC1 makes a special motion-on-standby at a place the game player likes in addition to making the LINK technique or no LINK technique, which makes the game more strategic and more amusing to the game players.

For example, for the player character PC1, the special motion-on-standby "when locked (LOCK), the player character PC1 stops at the position and emits fire forward".

Figure 12:
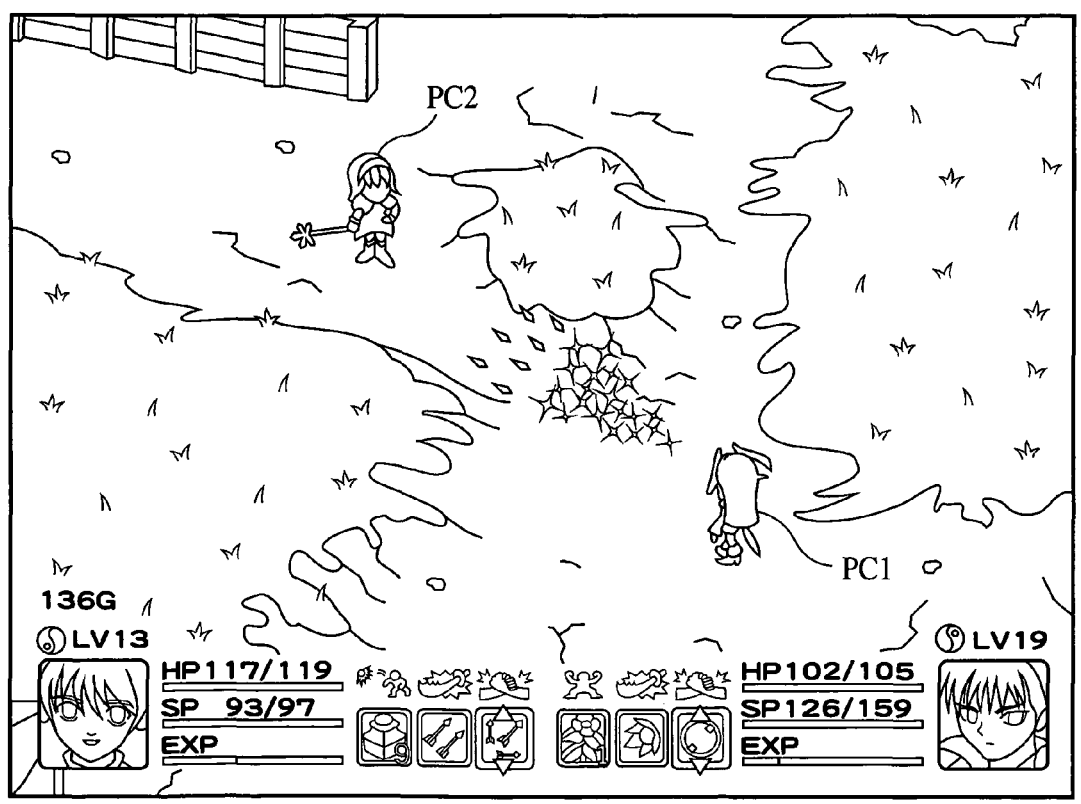
FIG. 12 is a game image illustrating the process of generating the LINK technique in the two-player game (Part 2).

When the player character PC1 is locked (LOCKED), the image that, as illustrated in FIG. 12, the player character PC1 emits fire forward at the present position is displayed, and the physical power parameter of an enemy character judged to have contacted the fire is decreased by a prescribed quantity, whereby the game can be progressed advantageously to the game players.

The size of the effective range and the extent of the effect of the special motion-on-standby is determined based on the ability parameter of the player character PC1. The player character PC1 is given an item which is effective to change the experience value and the ability parameter acquired by defeating an enemy character, whereby the ability parameter is grown and changed to thereby widen the effective range or increase the power. The special motion-on-standby is set not only to influence all enemy characters, but also to influence the enemy characters differently, depending on kinds of the enemy characters or influence none of the enemy characters.

The LINK is the operation that with the player character PC1 locked (LOCK), the game player operating the player character PC2 inputs an operation signal from the R1 button of the peripheral (controller) 116 to thereby make the LINK technique by both the player character PC1 and the player character PC2.

A kind of the LINK technique is determined by a game player in the LOCK state (who operates the player character PC1). The game player selects one of the LINK techniques owned by the player character PC1 and commands the selected LINK technique. The game player who makes the LINK technique (who operates the player character PC2) can concentrate on actions, such as aiming the LINK technique, etc. Examples of the LINK technique will be described later.

A kind of the LINK technique may be determined not by the locked game player (who operates the player character PC1) but by the game player who makes the LINK technique (who operates the game player character PC2).

In FIGS. 11 and 12, the player character PC1 is locked, but oppositely the player character PC 2 may be locked.

Figure 13:
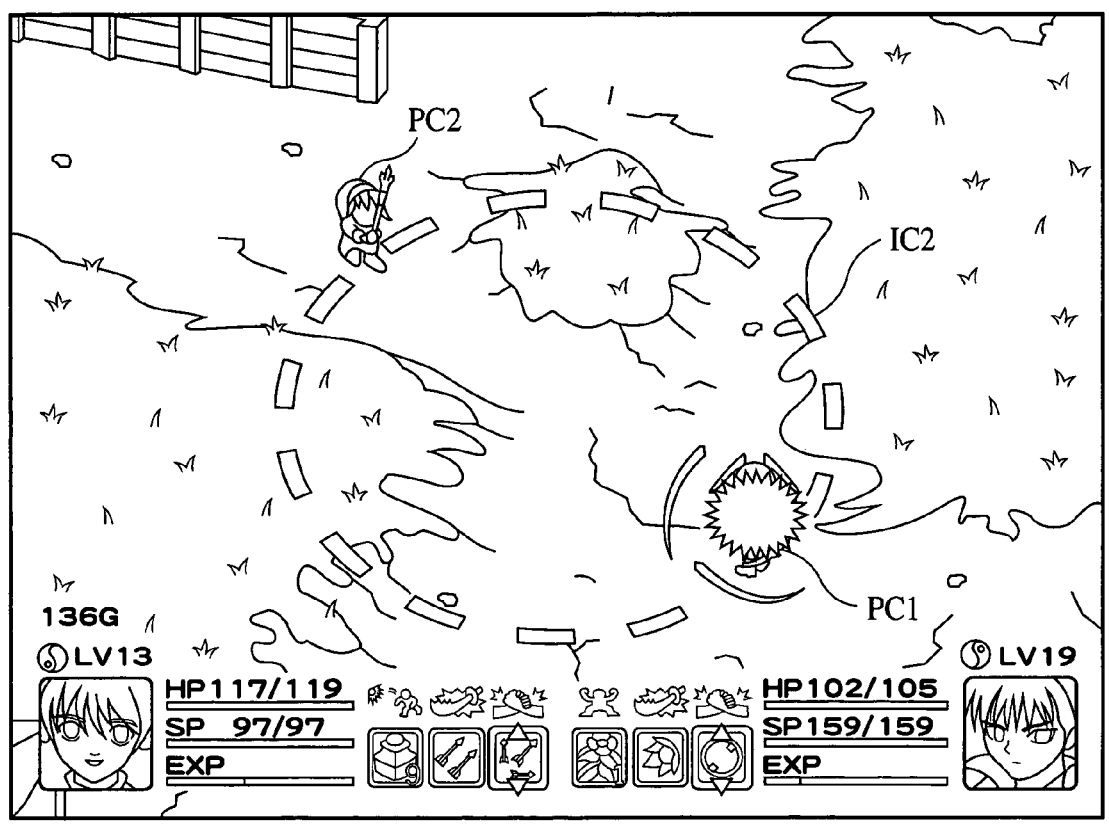
FIG. 13 is a game image illustrating the process of generating the LINK technique in the two-player game (Part 3).

As illustrated in FIG. 13, the second game player operates the R1 button of the peripheral (controller) 161, which is the operation unit, to thereby fix a position of his player character PC2 to the present position. The player character PC2 is locked, whereby a ring-shaped LINK technique icon IC2 expressing a place and a direction where the LINK technique is made, a form, etc. of the LINK technique is displayed.

At this time, the player character PC 1 is rendered to brighten so as to indicate that the player character PC2 is locked and is able to make the LINK technique.

Figure 14:
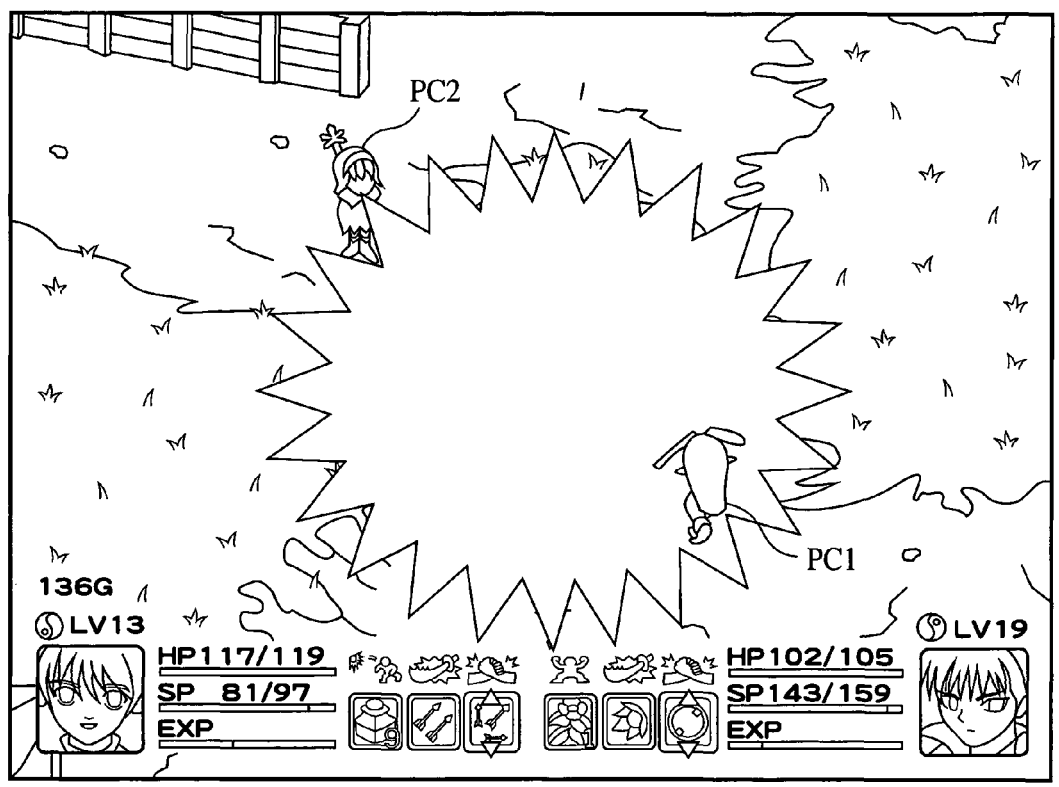
FIG. 14 is a game image illustrating the process of generating the LINK technique in the two-player game (Part 4).

Then, when the first game player operates the R1 button of the peripheral (controller) 114, which is the operation unit, as illustrated in FIG. 14, the player character PC1 and the player character PC2 make the LINK technique. A kind of the LINK technique is determined by the locked game player (who operates the player character PC1).

Figure 15:
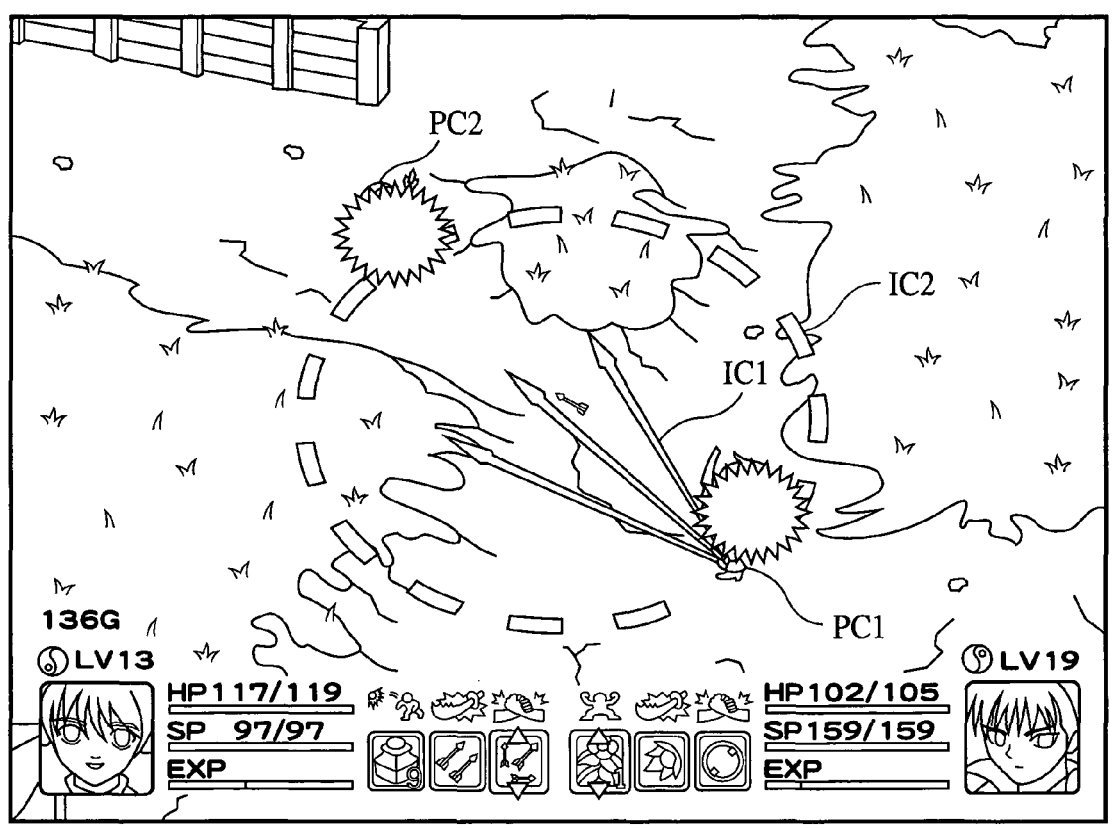
FIG. 15 is a game image illustrating the process of generating the LINK technique in the two-player game (Part 5).
Figure 16:
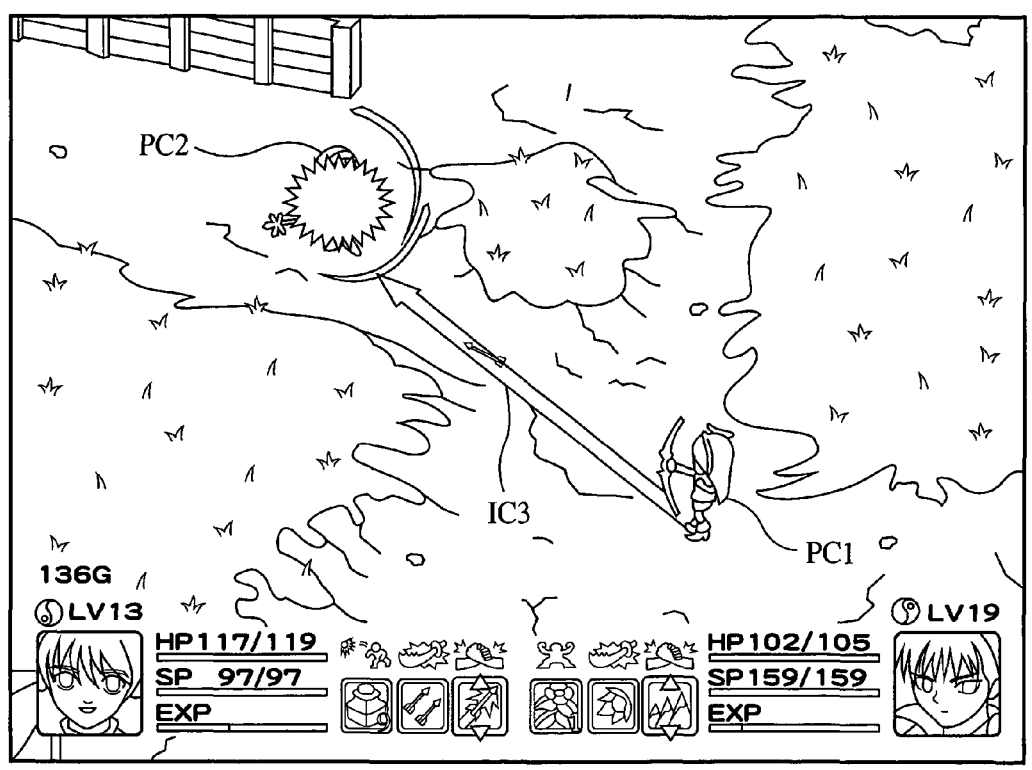
FIG. 16 is a game image illustrating the process of generating the LINK technique in the two-player game (Part 6).

FIG. 15 illustrates the double lock state that the player character PC1 is locked, and the player character PC 2 is also locked. A LINK technique icon IC1 of a technique to be made by the player character PC1, and a LINK technique icon IC2 of a technique to be made by the player character PC2 are displayed, and the surroundings of the player characters PC1, PC2 are rendered to respectively brighten so as to indicate that both are able to make the LINK techniques.

FIGS. 16 to 21 illustrate game images of another LINK technique.

Figure 18:
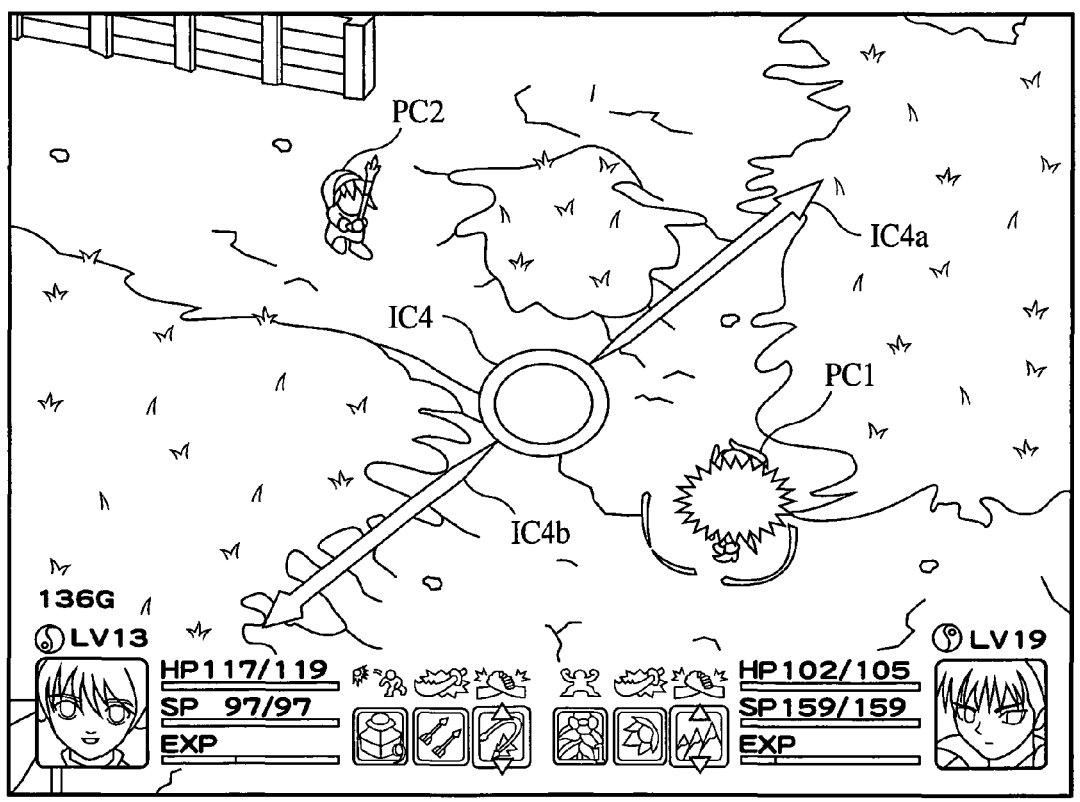
FIG. 18 is a game image illustrating the process of generating the LINK technique in the two-player game (Part 8).

FIG. 18 is a game image with the player character PC1 locked. A LINK icon IC3 expressing a place and a direction where the LINK technique is to be made by the player character PC1 toward the player character PC2 and a form, etc. of the LINK technique is displayed.

Figure 17:
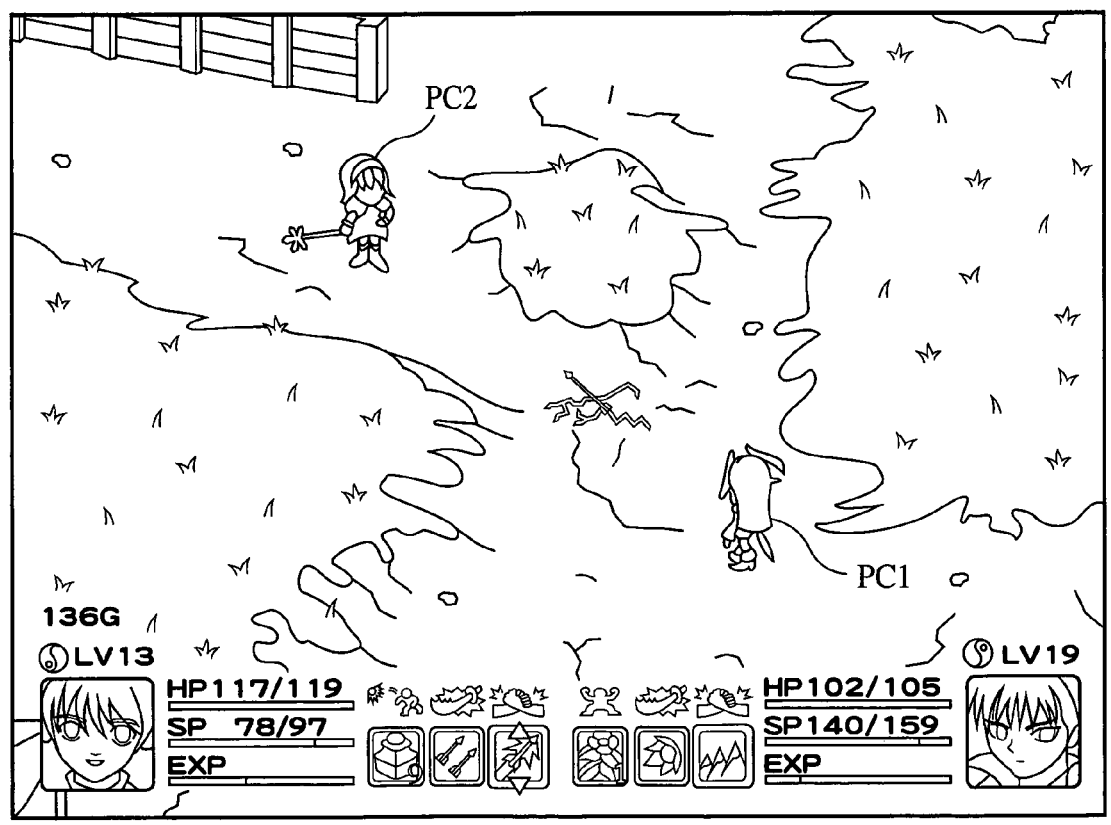
FIG. 17 is a game image illustrating the process of generating the LINK technique in the two-player game (Part 7).

FIG. 17 illustrates a game image that with the player character PC1 locked, the LINK technique has been made by the operation of the second game player. When the second game player operates the R1 button of the peripheral (controller) 116, which is the operation unit, the LINK technique is made by the player characters PC 1 and by the game player PC2.

FIG. 18 illustrates a game image with the player character PC2 locked. A LINK technique icon IC4 expressing a place and a direction where the LINK technique is to be made, and a form, etc. of the LINK technique is displayed substantially at the middle between a position of the player character PC1 and a position of the player character PC2. A direction in which the LINK technique is to be made is indicated by directions of an arrow IC4a and an arrow IC4b. The direction is set normal to the line interconnecting the player character PC1 and the player character PC2 and is controlled to be changed corresponding to a positional relationship between the player character PC1 and the player character PC2.

Figure 19:
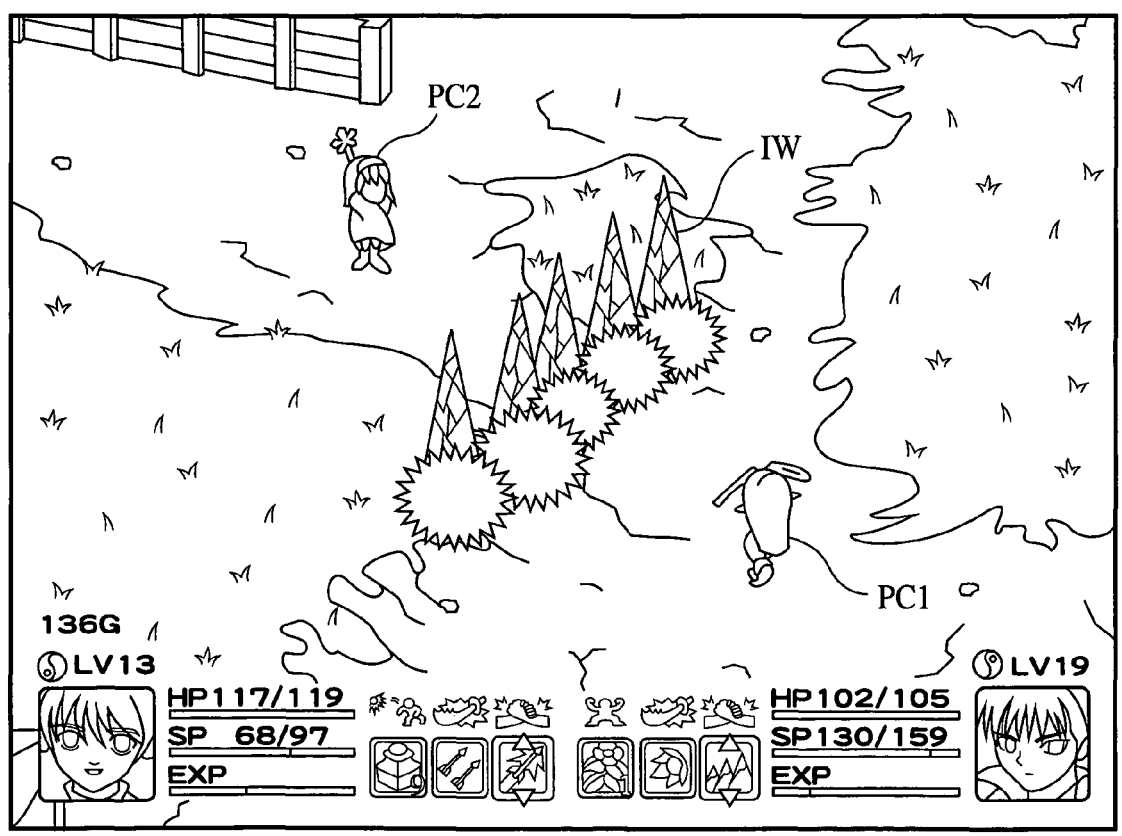
FIG. 19 is a game image illustrating the process of generating the LINK technique in the two-player game (Part 9).
Figure 20:
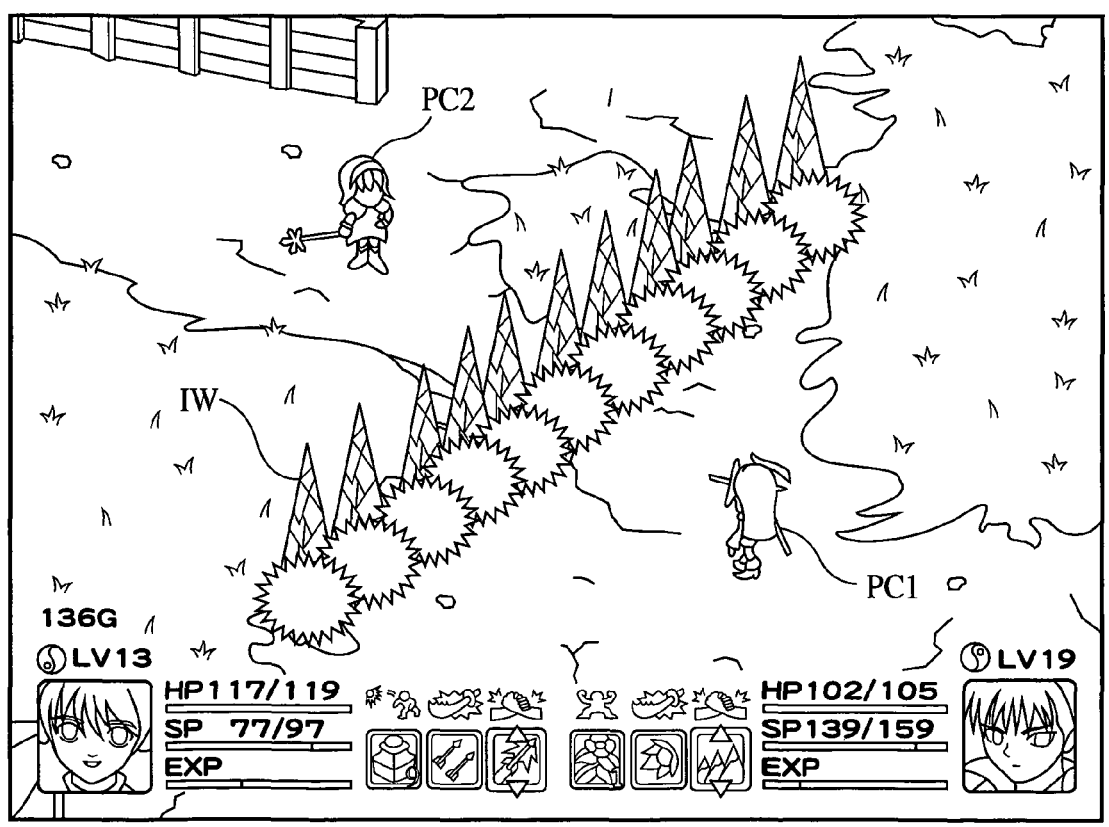
FIG. 20 is a game image illustrating the process of generating the LINK technique in the two-player game (Part 10).

FIGS. 19 and 20 illustrate game images that with the player character PC2 locked, the LINK technique is made by the operation of the first game player. When the first game player operates the R1 button of the peripheral (controller) 114, which is the operation unit, as illustrated in FIG. 19, a prescribed number of ice pillars IW set based on effective level of the LINK technique, etc. are displayed one after another in the direction indicated by the LINK technique icon IC4 between the layer character PC1 and the player character PC2, and finally an ice wall IW is formed as illustrated in FIG. 20.

Figure 21:
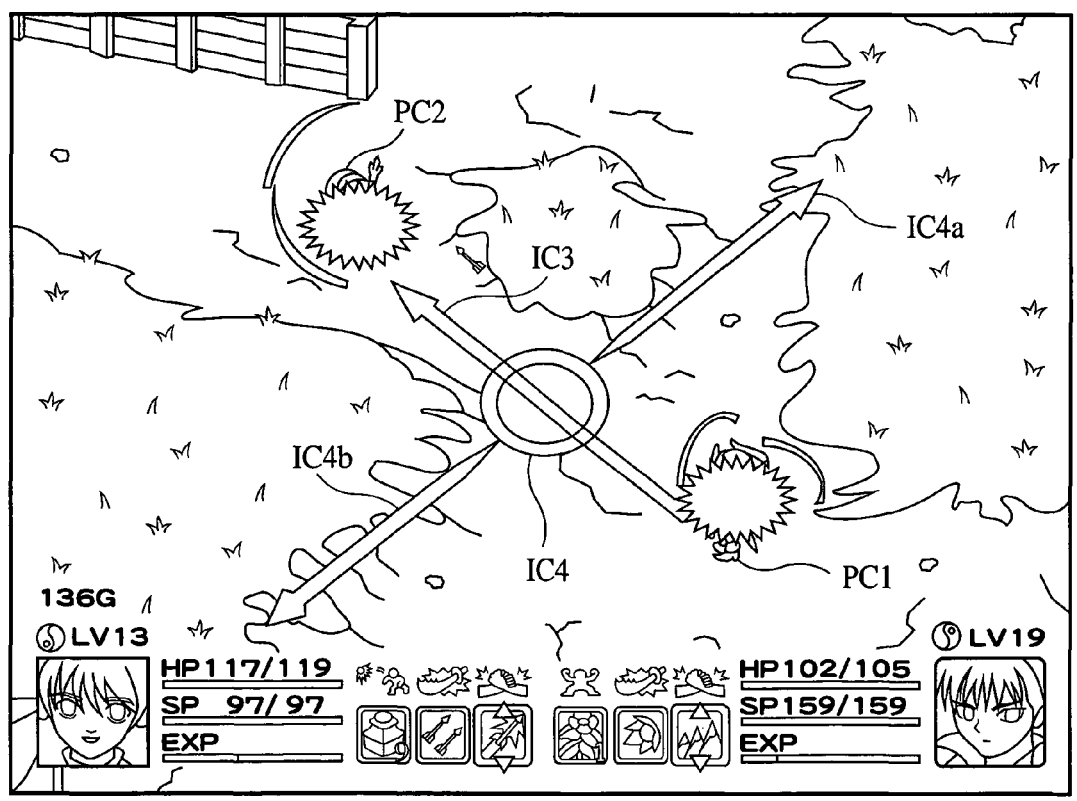
FIG. 21 is a game image illustrating the process of generating the LINK technique in the two-player game (Part 11).

FIG. 21 illustrates a game image of the double locked state with the player character PC1 and the player character PC2 both locked. A LINK technique icon IC3 of the LINK technique to be made by the player character PC2 and a LINK technique icon IC4 of the LINK technique to be made by the player character PC1 are displayed, and the surroundings of the player characters PC1, PC2 are rendered to respectively brighten so as to indicate that the player characters PC1, PC2 are able to make the LINK technique 4s.

(Processing of the Two-Player Game)

Then, the processing of the two-player game using the game program according to the present embodiment will be explained with reference to the flow chart illustrated in FIG. 9.

First, when the game program is started, the CPU 102 judges whether or not a LOCK operation input has been made from the peripheral (controller) 114 operated by the first game player (Step S101).

When no LOCK operation input has been made, the player character PC1 and the player character PC2 are moved based on operation signals respectively inputted by the first game player and the second game player, and the movements are generated in game images (Step S101).

When a LOCK operation input has been made from the peripheral (controller) 114, the player character PC1 is stopped at a position where the operation signal input was made, and the player character PC1 stands by (Step S103). At this time, the locked (LOCK) player character PC1 is controlled to have the defense power parameter increased by a prescribed quantity and to make a special motion-on-standby set for the player character PC1.

Next, the CPU 102 judges whether or not a selection operation for selecting a kind of the LINK technique has been made from the peripheral (controller) 114, which is operated by the first game player (Step S104). When no selection operation for selecting a kind of the LINK technique has been made, the CPU 102 stands by until the selection operation is made.

When the selection operation for selecting a kind of the LINK technique is made from the peripheral (controller) 114, the player character PC2 and the player character PC1 are related in the position with each other, based on a selected kind of the LINK technique, and a form and a display position of an icon image indicating the kind and an effective range of the LINK technique are determined. The icon image is processed to be displayed on the display monitor 110 (Step S105).

Next, the CPU 102 judges whether or not an operation for making the LINK technique has been made from the peripheral (controller) 116, which is operated by the other game player (Step S106). When no operation for making the LINK technique has been made, the CPU 102 stands by.

When an operation for making the LINK technique has been made, a position for making the LINK technique is determined, based on a positional relationship and a distance between positions of the player characters PC1, PC2 at this time (Step S107).

Then, an effective range of the LINK technique is determined, based on a positional relationship and a distance between the player characters PC1, PC2 at this time, and parameters of the effect extent of the LINK technique, etc. (Step S109). Images of the LINK technique are generated (Step S109), the effect of the LINK technique on an enemy character positioned in a specific effective range is computed, and a display of the enemy character is controlled corresponding to the effect (Step S110). Thus, the LINK technique processing of the two-player game is completed.

When a LOCK operation is made from the peripheral (controller) 116, which is operated by the second game player, the same processing as the flow chart of FIG. 9 is repeated.

As described above, according to the present embodiment, the two-player game has, e.g., the following advantage in comparison with the conventional game. That is, the player character PC1 is moved with reference to a position of the player character PC2 as the reference to thereby determine an effective range of the LINK technique and a point for making the LINK technique, whereby the game player can more feel as if the game is played in closer cooperation with the player character PC1 than in generating a technique owned by the player character PC1 by the operation of the game player.

MODIFIED EMBODIMENTS

The present invention is not limited to the above-described embodiment and can cover other various modifications.

For example, in the above-described embodiment, a position of a partner character or a player character is fixed to the present position by the LOCK operation. However, it is possible that an icon indicating that a position where he was locked is a point for making the LINK technique is displayed, and a point for making the LINK technique is decided with reference to the icon while the player character or the partner character himself is set on movable.

In the present embodiment, a partner character is normally movable by himself in accordance with a prescribed algorithm. However, a partner character may be operated based on input signals from controllers connected to the game device and from the controller connected to the game devices via communication circuits, i.e., may be operated by a second game player who operates the controller. In this case, the LOCK operation is made by the operator of the partner character, and an effective range of the LINK technique, etc., and the operation of the LINK technique can be identified by the player character moving, whereby the operators of respective characters can use the LINK technique in common to thereby make the cooperative play more amusing.

In the above-described embodiment, the so-called action game in which player characters make motions in real time, based on operations of game players is described. However, the present invention is applicable also to idea games, such as board games, simulation games, etc. in which player characters and partner characters are present, and they can cooperate with each other to make cooperative motions.

What is claimed is:

1. A non-transitory computer readable medium recorded on a game program for operating a computer as means for moving game characters in a game field, based on input signals inputted from an operation unit and outputting the motions to display means,
   a player character directly controllable to move based on input signals a game player inputs from the operation unit, and a partner character which moves based on a prescribed motion algorithm contained in the game program being set,
   the game program comprising:
   the processing of judging whether or not a first input signal has been inputted from the operational unit to directly move the player character;
   the processing of displaying a stopped position of the partner character in the game field when it is judged that the first input signal has been inputted; and
   the processing of restricting a range where the player character is movable to a prescribed range set in relation to said stopped position, but not restricting a range where the partner character is movable to the prescribed range set with said stopped position, the movement of the player character being independent of the partner character.

2. The non-transitory computer readable medium of claim 1, further comprising:
   the processing of judging whether or not a second input signal has been inputted after the first input signal was inputted from the operation unit;
   the processing of, when it is judged that the second input signal has been inputted, based on a positional relationship between the player character and said position and a kind of a prescribed cooperative motion set corresponding to the second input signal, determining an effective range of the cooperative motion; and
   the processing of making the cooperative motion in the determined effective range.

3. The non-transitory computer readable medium of claim 1, further comprising:
   the processing of determining an effective range of the cooperative motion or a position to be a generation point where the effective range of the cooperative motion or the cooperative motion is generated, based on a positional relationship between the player character and said position and a kind of a prescribed cooperative motion set corresponding to either of the player character and the partner character or a combination of them, when it is judged that the first input signal has been inputted; and
   the processing of displaying images indicating a kind of the cooperative motion, and the effective range or a generation point at the effective range or the generation point of the cooperative motion.

4. The non-transitory computer readable medium of claim 1, further comprising:
   the processing of, when it is judged that the first input signal has been inputted, stopping a position of the partner character at a position where the partner character was when the first input signal was inputted, thereby to display said position.

5. The non-transitory computer readable medium of claim 1, further comprising:
   the processing of, when it is judged that the first input signal has been inputted, stopping a position of the partner character at a position where the partner character was when the first input signal was inputted, thereby to display said position, and executing a special motion based on information of standby special motions set for the partner character.

6. The non-transitory computer readable medium of claim 1, further comprising:
the processing of displaying an icon indicating said position of the partner character in the game field when it is judged that the first input signal has been inputted.

7. A non-transitory computer readable medium recording recorded on a game program for operating a computer as means for moving game characters in a game field, based on input signals inputted from an operation unit and outputting the motions to display means,
a player character directly controllable to move based on input signals a game player inputs from the operation unit, and a partner character which moves based on a prescribed motion algorithm contained in the game program being set,
the game program comprising:
the processing of judging whether or not a first input signal has been inputted from the operational unit to directly move the player character; and
the processing of restricting a range where the player character is movable to a prescribed range set with a present stopped position of the partner character in the game field as a reference when it is judged that the first input signal has been inputted,
wherein the inputted first signal controls the movements of the player character independent of those corresponding to the partner character.

* * * * *